United States Patent
Lazzara et al.

(10) Patent No.: US 12,481,787 B2
(45) Date of Patent: Nov. 25, 2025

(54) METHOD FOR PRIVACY MANAGEMENT OF MULTIMEDIA CONTENT

(71) Applicant: PICA GROUP S.P.A., Milan (IT)

(72) Inventors: Daniele Lazzara, Cervia (IT); Enrico Minotti, Cervia (IT); Manolo Martini, Figline e Incisa Valdarno (IT)

(73) Assignee: PICA GROUP S.P.A., Milan (IT)

( * ) Notice: Subject to any disclaimer, the term of this patent is extended or adjusted under 35 U.S.C. 154(b) by 205 days.

(21) Appl. No.: 18/277,210

(22) PCT Filed: Feb. 21, 2022

(86) PCT No.: PCT/IB2022/051519
§ 371 (c)(1),
(2) Date: Aug. 14, 2023

(87) PCT Pub. No.: WO2022/175913
PCT Pub. Date: Aug. 25, 2022

(65) Prior Publication Data
US 2024/0143836 A1  May 2, 2024

(30) Foreign Application Priority Data
Feb. 22, 2021 (IT) .................. 102021000004061

(51) Int. Cl.
*G06F 21/62* (2013.01)
(52) U.S. Cl.
CPC ............................ *G06F 21/6254* (2013.01)
(58) Field of Classification Search
CPC .................................................. G06F 21/6254
See application file for complete search history.

(56) References Cited

U.S. PATENT DOCUMENTS

| | | | |
|---|---|---|---|
| 11,012,439 B1* | 5/2021 | Rosenberg | G06F 21/32 |
| 11,973,860 B1* | 4/2024 | Ghetti | H04L 9/0819 |
| 12,147,548 B1* | 11/2024 | Pena | G06F 21/6245 |
| 2015/0242638 A1 | 8/2015 | Bitran et al. | |
| 2016/0294781 A1 | 10/2016 | Ninan et al. | |
| 2021/0141698 A1* | 5/2021 | Bourgeois | G06F 16/353 |
| 2021/0141913 A1* | 5/2021 | Mosconi | G06F 21/629 |
| 2021/0201371 A1* | 7/2021 | Andrews | G06Q 30/06 |
| 2021/0209248 A1* | 7/2021 | Feuz | G06N 3/045 |
| 2021/0273804 A1* | 9/2021 | Khan | H04L 9/3234 |
| 2021/0303720 A1* | 9/2021 | Creenaune | H04L 63/0428 |

(Continued)

FOREIGN PATENT DOCUMENTS

| | | |
|---|---|---|
| WO | 2014028009 | 2/2014 |
| WO | 2017027787 | 2/2017 |

OTHER PUBLICATIONS

International Preliminary Report on Patentability in corresponding International Patent Application No. PCT/IB2022/051519, mailed May 12, 2023 (8 pages).

*Primary Examiner* — Stephen T Gundry
(74) *Attorney, Agent, or Firm* — Leason Ellis LLP

(57) ABSTRACT

The invention generally refers to a method for privacy management of multimedia contents comprising: a step of acquisition of at least one multimedia content, a step of recognition of one or more users shown in the multimedia content, a step of configuration of a privacy policy associated with at least one user among the one or more users, and a step of application of the privacy policy to the multimedia content.

8 Claims, 6 Drawing Sheets

(56) References Cited

U.S. PATENT DOCUMENTS

| | | | | |
|---|---|---|---|---|
| 2021/0319083 | A1* | 10/2021 | Bernardi | H04L 51/10 |
| 2021/0342860 | A1* | 11/2021 | Johnson | H04W 12/06 |
| 2021/0357530 | A1* | 11/2021 | Tsubouchi | H04N 1/4493 |
| 2021/0409400 | A1* | 12/2021 | Palanisamy | H04L 67/12 |
| 2021/0409409 | A1* | 12/2021 | Palanisamy | G06F 21/62 |
| 2022/0012364 | A1* | 1/2022 | LaFever | H04L 63/0407 |
| 2022/0050921 | A1* | 2/2022 | LaFever | G16H 10/60 |
| 2022/0198034 | A1* | 6/2022 | Rodriguez | H04L 9/008 |
| 2022/0210515 | A1* | 6/2022 | Ravuru | G06Q 50/01 |
| 2023/0054446 | A1* | 2/2023 | LaFever | H04W 12/75 |
| 2023/0237132 | A1* | 7/2023 | Beckett, Jr. | G06F 16/955 |
| | | | | 713/186 |
| 2023/0237349 | A1* | 7/2023 | Donoho | G06Q 40/08 |
| | | | | 706/46 |
| 2023/0368198 | A1* | 11/2023 | Gonzales, Jr. | H04L 9/30 |

* cited by examiner

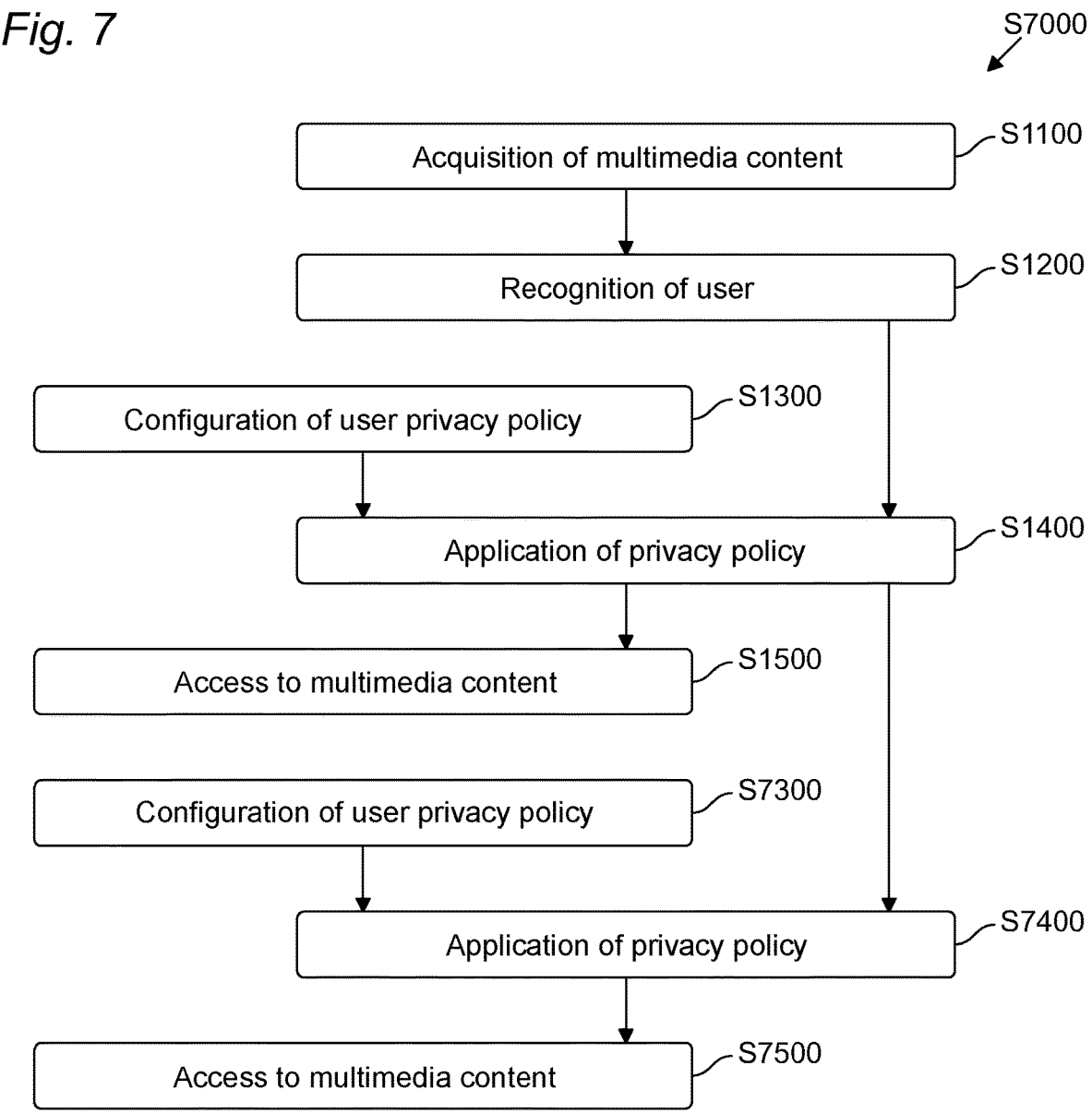

METHOD FOR PRIVACY MANAGEMENT OF MULTIMEDIA CONTENT

This Patent Application is a U.S. National Phase Application under 35 U.S.C. § 371 of International Patent Application No. PCT/IB2022/051519, filed on Feb. 21, 2022, which claims priority from Italian Patent Application No. 102021000004061, filed on Feb. 22, 2021, all of which are incorporated by reference, as if expressly set forth in their respective entireties.

The present invention relates to a method for privacy management of a multimedia content, for example photos and/or videos.

DESCRIPTION OF THE PRIOR ART

At various events, such as sporting competitions, concerts, meetings, celebrations, a large public and one or more photographers are present. During the event the photographers can take one or more photos, or shoot one or more videos, hereinafter both generally defined as multimedia contents.

The participants at the event are generally interested in being able to access multimedia contents recorded during the event. Some examples are a marathon runner who wishes a photo taken at the finishing line of a marathon, a family that wishes a photo taken in an amusement park, or a group of friends at a concert that wishes a souvenir video.

In order to obtain professional results, various professionals, such as photographers or cameramen, are often present at said events and are in charge of creating the aforesaid multimedia contents. In these cases, it is useful to allow the people visible in said multimedia contents to access them, in a simple, safe and efficient way. Different modes have been conceived for this purpose. For example, there are modes based on recognition of tags or recognition of the faces of the users. Generally, the service for management of the multimedia contents and of access thereto is offered by a service provider.

However, there is a problem linked to the management of privacy in multimedia contents in which more than one user is present. In particular, if several users are present in the photo, it is possible that some users wish to allow the others to recognize his/her face, while other users do not wish to be recognised.

Hence, there is the need to allow participants at an event to manage their privacy relative to the multimedia contents that show them, in a way that is simple for the participants, i.e., the users of the service, and in a way that is safe and technically and commercially manageable by the service provider for access to the multimedia contents.

Methods of privacy management in multimedia content are known from WO 2014/028009 A1, US 2016/294781 A1, US 2015/242638 A1, and WO 2017/027787 A1.

SUMMARY OF THE INVENTION

The solution of the invention allows users to specify a privacy policy for management of the multimedia contents that show them. This privacy policy is applied by the service provider before providing access to the multimedia contents.

A method for privacy management of multimedia contents can in particular comprise: a step of acquisition of at least one multimedia content, a step of recognition of one or more users shown in the multimedia content, a step of configuration of a privacy policy associated with at least one user among the one or more users, and a step of application of the privacy policy to the multimedia content.

Thanks to this configuration, it is advantageously possible to protect the privacy of the users in the multimedia content in a specific way, by applying any privacy policies associated with the users shown.

In some embodiments, the step of application can comprise: a step of selecting a first user from the one or more users, an evaluating step to evaluate whether in the multimedia content one or more second users are shown, different from the first user, and if at the evaluating step it is evaluated that in the multimedia content one or more second users are shown, different from the first user, a step of modifying at least part of the multimedia content based on the privacy policy associated with the one or more second users.

Thanks to this configuration, it is advantageously possible to apply the privacy policy of the respective second users recognized in the multimedia content.

In some embodiments the step of modifying can comprise: a second evaluating step to evaluate whether a privacy policy is associated with the one or more second users, and if at the second evaluating step it is evaluated that a privacy policy is associated with the one or more second users, a second step of modifying the multimedia content based on the privacy policy associated with the one or more second users.

Thanks to this configuration, it is advantageously possible to apply the privacy policies in the case in which these are available.

In some embodiments, at the step of modifying a copy of the multimedia content can be modified.

Thanks to this configuration, it is advantageously possible to maintain an original version of the multimedia content.

In some embodiments, the method can further comprise: a step of saving the copy of the multimedia content.

Thanks to this configuration, it is advantageously possible to make the copy accessible.

In some embodiments, the step of modifying can comprise: a step of generating a tag associated with the copy of the multimedia content.

Thanks to this configuration, it is advantageously possible to associate metadata with the copy, which can, for example, be used to indicate which privacy policies were taken into consideration in generation of the copy. In some embodiments, in the step of modifying the part of the multimedia content comprising a face of the one or more second users can be modified.

Thanks to this configuration, it is advantageously possible to reduce the use of computational resources required for modification.

In some embodiments, the method can further comprise: a step of saving the modified part of the multimedia content.

Thanks to this configuration, it is advantageously possible to reduce the use of computational resources required for storing the modification.

In some embodiments, the step of modifying can comprise: a step of saving coordinates of the modified part of the multimedia content.

Thanks to this configuration, it is advantageously possible to recombine the modified part in the multimedia content.

The invention can also refer to software configured so as to, when executed on a processor, operate the processor so as to execute any one of the methods described.

BRIEF DESCRIPTION OF THE FIGURES

Further features and advantages of the method according to the present invention will be more apparent from the following description, provided with reference to the accompanying figures which show illustrate non-limiting examples of embodiment thereof, in which identical or corresponding parts of said device are identified by the same reference numbers. In particular:

FIG. 7 schematically illustrates a possible embodiment of a method 7000 for privacy management of multimedia contents.

DETAILED DESCRIPTION OF PREFERRED EMBODIMENTS

Figure 1:
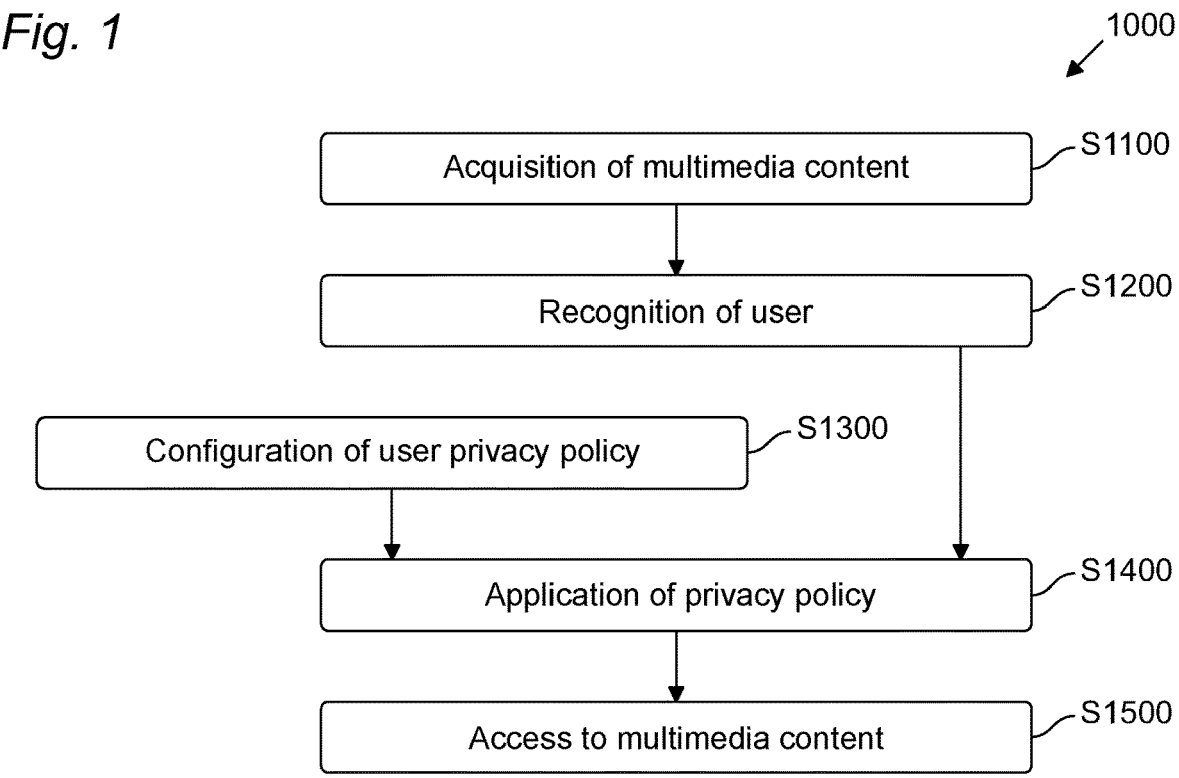
FIG. 1 schematically illustrates a method 1000 for privacy management of multimedia contents.

FIG. 1 schematically illustrates a method 1000 for privacy management of multimedia contents.

In particular, the method 1000 for privacy management of multimedia content comprises a step S1100 of acquisition of at least one multimedia content 3100. The multimedia content 3100 could be any one between a photograph, a video, or any type of digital file that, when viewed, results in viewing of the face of at least one person. The step S1100 of acquisition can be implemented by a computing device, for example, by a computer, or a server, of a service provider. Acquisition of the multimedia content can be implemented in any known way to acquire multimedia contents by a computer, for example by means of upload of a file corresponding to the multimedia content to the computer.

The method 1000 further comprises a step S1200 of recognition of one or more users 3201-3203 shown in the multimedia content 3100. The step of recognition S1200 can be implemented with any known technology for facial recognition in multimedia contents. It will be clear to those skilled in the art that different technologies exist for this purpose and therefore they will not be described in more detail. In general, it will be clear that facial recognition in the multimedia content generally results in the identification of one or more areas of the multimedia content, each comprising the face of a person.

The method 1000 further comprises a step S1300 of configuration of a privacy policy 3301-3303 associated with at least one user among the one or more users 3201-3203. The step S1300 of configuration of the privacy policy can be carried out by the respective user on a digital device connected, or connectable, to the computing device of the service provider. For example, the service provider can provide software, for example an app, that the user can utilize on his/her digital device to configure his/her privacy policy 3301-3303. Alternatively, or additionally, the service provider can provide a website on which the user can configure his/her privacy policy 3301-3303. The configuration thus obtained can then be transmitted to the computing device of the service provider in a known way. In some embodiments, the privacy policy 3301-3303 can comprise a digital file with a content that allows determination of whether or not a user associated with the privacy policy wishes to make his/her face visible in the multimedia contents. In more specific embodiments, for example if different modes of obscuring the face are provided, the content of the digital file can also allow determination of which of the different modes of obscuring the face the user wishes to use.

Preferably, the privacy policy 3301-3303 will be saved on the computer of the service provider. In preferred embodiments, configuration of the privacy policy of the user, i.e., step S1300, can be implemented more than once by the user, hence overwriting previous privacy policies, if the user changes his/her mind in relation to management of his/her privacy of the multimedia contents.

As can be seen in FIG. 1, the step of configuration of the privacy policy S1300 is preferably executed before the step S1400 of application of the privacy policy, but has no particular time requirements for execution with respect to steps S1100 and S1200. In other words, the step of configuration of the privacy policy S1300 can be carried out before, after, or simultaneously to any one of steps S1100 and S1200.

In preferred embodiments, the privacy policy 3301-3303 can be associated with a specific user 3201-3203 by means of association with a unique identifier associated with said user. For example, the unique identifier associated with said user could be a username of the user utilized by the service provider to recognize the specific user and/or utilized by the user to access the services provided by the service provider. Alternatively, or additionally, the unique identifier associated with said user could be a photo of the face of the user and/or a digital identifier uniquely derivable from the face of the user, by means of known algorithms, which allow an alphanumeric string to be uniquely derived from a given face.

In preferred embodiments, the step S1200 of recognition of the user can further allow recognition of the face of a user in the area comprising a face, and association of the unique identifier of the user with the area and/or with the multimedia content comprising his/her face. This embodiment is particularly advantageous in the case in which the user has previously registered with the service provider and has provided a photo of his/her face and/or a unique digital identifier derivable uniquely from a photo of his/her face by means of known algorithms, as already described above. In this way, at execution of the step of user recognition S1200 it will be possible to associate a unique identifier of the user with the area and/or with the multimedia content comprising his/her face. In cases in which the user has not already registered with the service provider at the time of execution of the step of user recognition S1200, it will be possible to associate a temporary unique identifier with the new face recognized in the multimedia content and not present among the faces already associated with users registered with the service provider. The temporary unique identifier can then subsequently be associated with and/or replaced by the unique identifier of the user at the time at which the user registers with the service provider. In some embodiments, registration of the user with the service provider, so as to associate a unique identifier with the user, can be carried out at the latest simultaneously with the step S1300 of configuration of the privacy policy, in the case in which the user did not provide a unique identifier of the user, with which the privacy policy is to be associated.

The method 1000 further comprises a step S1400 of application of the privacy policy 3301-3303 to the multimedia content 3100. In general, the step S1400 comprises reading of the privacy policy, previously configured at step S1300, and its application to the user associated with said privacy policy and recognized in the multimedia content. According to the privacy policy configured by the user, application of the privacy policy can result in a modification of the multimedia content. For example, in the case in which the user has decided to make his/her face unrecognizable in the multimedia contents, the step of application S1400 will result in a modification of at least part of the multimedia content comprising the face of the user, so as to make said face unrecognizable.

The method 1000 can further comprise a step S1500 of accessing the multimedia content 3100. In general, accessing the multimedia content can be implemented in any way that makes it possible for one or more users to view and/or save a copy of the digital content. In some preferred embodiments, the step S1500 of accessing the multimedia content 3100 can also be restricted solely to the users 3201-3203 who have been recognized, at step S1200, as present in the multimedia content S1500.

Thanks to the invention, it is therefore possible to allow the configuration of a privacy policy by one or more users 3201-3203, before access to the multimedia content 3100 is made possible to the users visible therein and/or more generally to the users of the service provider and/or even more generally, to the public. In this way, it is advantageously possible to ensure that each user has control of his/her privacy regarding the multimedia contents in which his/her face is shown.

It is possible for multimedia contents 3100 to exist for which one or more users have been recognized at step S1200 for at least one of whom a privacy policy has not been configured at step S1300. This can occur, for example, in the case in which the user has no interest in configuring a privacy policy and/or in the case in which the user has not yet had time to configure it. In preferred embodiments, it will be possible to apply a default privacy policy for the users recognized in the multimedia content 3100 and for whom a privacy policy has not been configured. Preferably, the default privacy policy is configured so as to make the face of said users unrecognizable. Alternatively, or additionally, in the case of multimedia contents 3100 with the presence of users for whom a privacy policy is not available, access to said multimedia contents can be blocked for a predetermined time, for example one day or one week, so as to allow all the users visible in the multimedia content to configure their privacy policy in time.

Figure 2A:
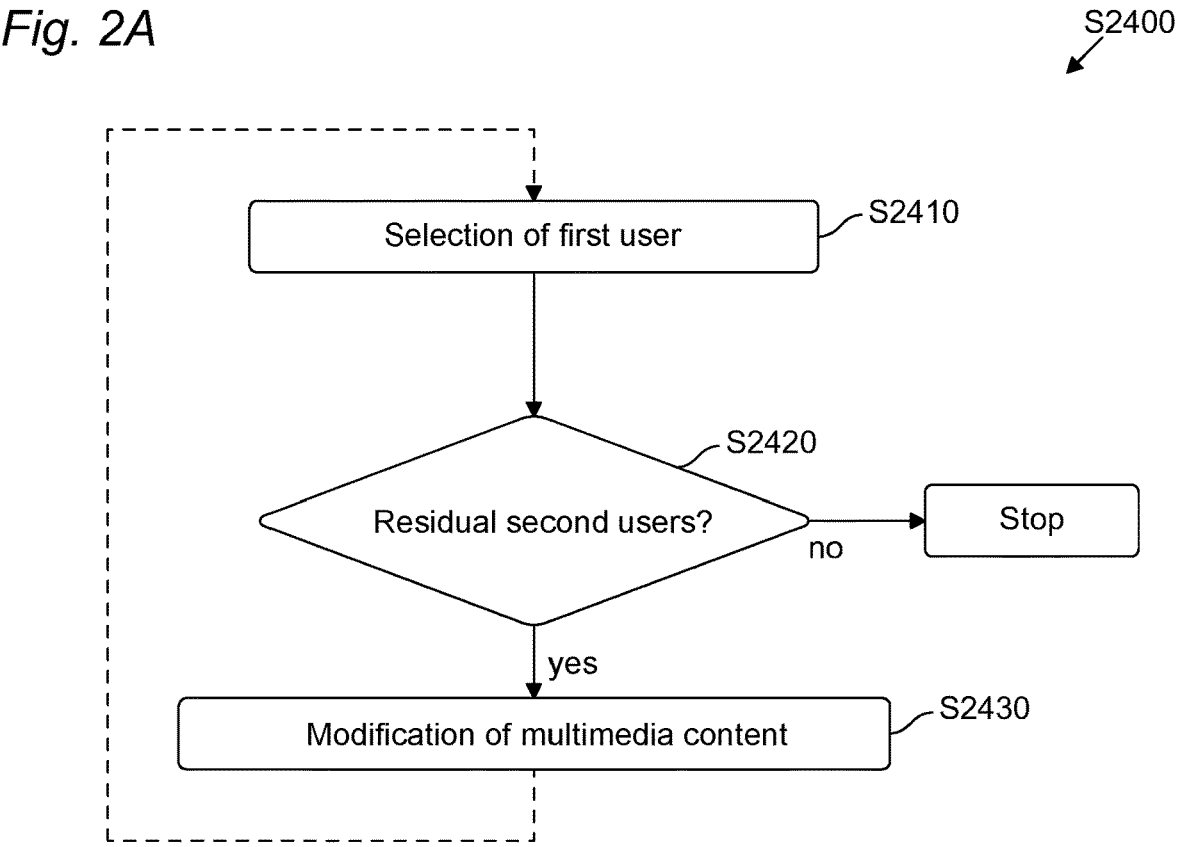
FIGS. 2A-2B schematically illustrate a possible embodiment of parts of the method 1000 of FIG. 1.
Figure 2B:
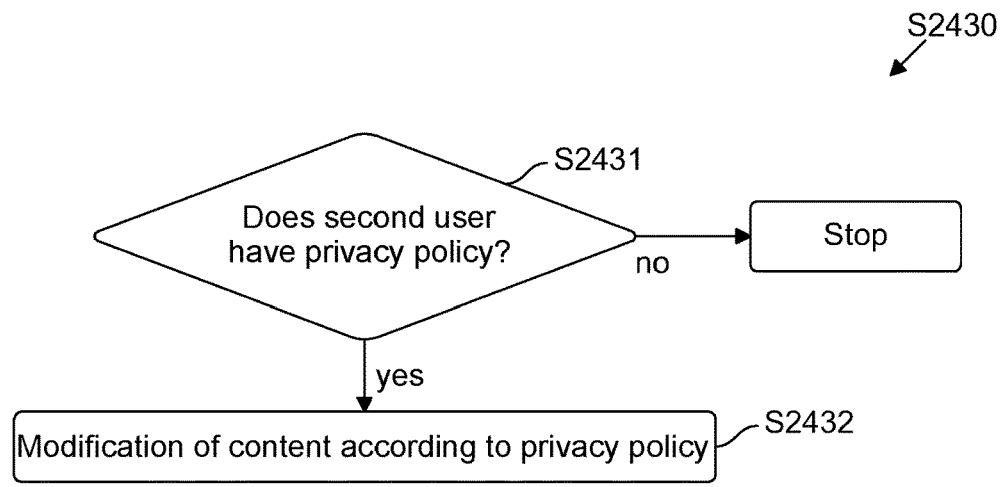
Figure 3:
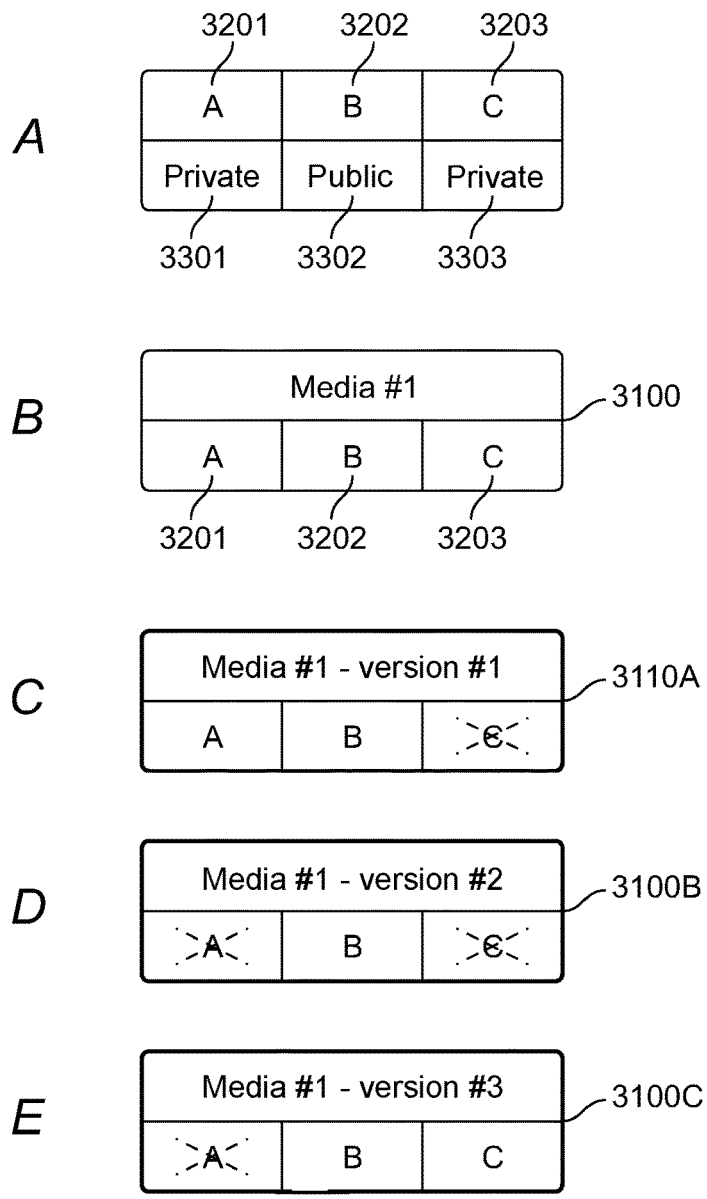
FIG. 3 schematically illustrates an example of application of the embodiment of FIGS. 2A-2B.

FIGS. 2A-2B schematically illustrate a possible embodiment of parts of the method 1000 of FIG. 1. FIG. 3 schematically illustrates an example of application of the embodiment of FIGS. 2A-2B.

In particular, FIG. 2A represents a possible specific embodiment of step S1400 of the method 1000, in the form of a step of application S2400. As can be seen in FIG. 2A, the step of application S2400 can comprise a step S2410 of selecting a first user 3201 from the one or more users 3201-3203 recognized in the multimedia content 3100.

The step of application S2400 can further comprise an evaluating step S2420 to evaluate whether in the multimedia content 3100 one or more second users 3202-3203 are shown, different from the first user 3201. In the case in which at the evaluating step S2420 it is evaluated that in the multimedia content 3100 one or more second users 3202-3203 are shown, different from the first user 3201, the step S2400 can further comprise a step S2430 of modifying at least part of the multimedia content 3100 based on the privacy policy 3302-3303 associated with the one or more second users 3202-3203. Instead, in the case in which at the evaluating step S2420 it is evaluated that in the multimedia content 3100 no users besides the first user 3201 are visible, the step of application S2400 can be terminated.

In this way, it is advantageously possible to proceed with application of the privacy policy only for those multimedia contents 3100 in which more than one user is present. In other words, in the multimedia contents where only the first user 3201 is present, modification of the multimedia content can be avoided, so as to reduce the use of computational resources at the service provider.

FIG. 2B illustrates a possible embodiment of the step of modifying S2430 of FIG. 2A. In particular, as can be seen in FIG. 2B, the step of modifying S2430 can comprise a second evaluating step S2431 to evaluate whether a privacy policy 3302-3303 is associated with the one or more second users 3202-3203. If at the second evaluating step S2431 it is evaluated that a privacy policy 3302-3303 is associated with the one or more second users 3202-3203, the step of modifying S2430 can further comprise a second step of modifying S2432 the multimedia content 3100 based on the privacy policy 3302-3303 associated with the one or more second users 3202-3203. Otherwise, if at the second evaluating step S2431 it is evaluated that no privacy policy 3302-3303 is associated with the one or more second users 3202-3203, the step of modifying S2430 can be terminated.

In this way, it is advantageously possible to proceed with application of the privacy policy of the one or more second users 3202,3203 according to the existence and to the configuration of the corresponding privacy policy.

In some embodiments, in alternative to termination of the step S2430 in the case in which at the second evaluating step S2431 it is evaluated that no privacy policy is associated with the one or more second users 3202-3203, the step of modifying S2430 can alternatively comprise the application of a default privacy policy, as described previously.

FIG. 3 schematically illustrates an example of application of the embodiment of FIGS. 2A and 2B, so as to better clarify its operation.

In the example illustrated in FIG. 3, three users 3201-3203 who have been recognized in the multimedia content 3100 are considered to be present. It is also assumed that a privacy policy 3301, 3303 is available for each of the users 3201, 3203. In the example illustrated, the privacy policy can assume one of two values: "public" or "private", where "public" means that the user associated with the privacy policy does not wish to modify his/her face within the multimedia contents 3100, while "private" means that the user associated with the privacy policy wishes to maintain his/her face private in the multimedia contents in which the face is recognized, modifying or obscuring it. It will be clear that other modes of configuration of the privacy policy are possible, and that the one illustrated in the example of FIG. 3 is to be understood as non-limiting example of the possibilities of embodiment of the privacy policy.

In particular, the portion A of FIG. 3 schematically represents the content of a memory of the computing device of the service provider at the time of execution of the method 1000, relative to the users registered with the service provider and to the respective privacy policies. More specifically, the memory comprises at least three unique identifiers A, B and C of three users 3201-3203, and the corresponding privacy policies 3301, 3303.

The portion B of FIG. 3 schematically represents the content of the memory of the computing device of the service provider relating to a multimedia content identified in Fig. as Media #1. In particular, the three unique identifiers of the users A, B, C that have been recognized therein are associated with the multimedia content Media #1. It will be clear that, the multimedia content Media #1, identified here as a string for simplicity of illustration, can instead be any type of known digital multimedia content, such as a video or a photograph. Association of the multimedia content 3100 with the unique identifiers A, B, and C of the users 3201-3203 that have been recognized therein can be implemented in a known way, for example by associating tags with the multimedia content, or through database techniques known per se.

The portion C of FIG. 3 schematically represents the content of the memory of the computing device of the service provider relating to the case in which the first user selected at the step of selecting S2410 is the user 3201, corresponding to the identifier A. In this case, at the evaluating step S2420, the existence of further users recognized in the multimedia content 3100, the second users 3202, 3203, will be determined. As there is a privacy policy for both, this will be applied at step S2432, resulting in a modified version #1 of the multimedia content media #1. In particular, as schematically illustrated, in the modified version #1 the face of the user 3202 associated with the identifier B remains visible while the face of the user 3203 associated with the identifier C is blurred, or in any case modified, in compliance with the privacy policy 3303. The version #1 of the media #1 can be the version that will then be made available to the user 3201 at step S1500.

Analogously, in the modified version #2 visible in the portion D of FIG. 3, the first user for the purposes of the step of selecting S2410 will be the user 3202. For the methods already described above, this results in a modified version #2 of the multimedia content Media #1 in which the faces of the users 3201 and 3203 are blurred, or in any case modified, in compliance with the respective privacy policies 3301, 3303. The modified version #2 is the version made available to the user 3202 at step S1500.

Finally, analogously, in the modified version #3 visible in the portion E of FIG. 3, the first user for the purposes of the step of selecting S2410 will be the user 3203. For the modes already described above, this results in a modified version #3 of the multimedia content Media #1 in which the face of the user 3201 is blurred, or in any case modified, in compliance with the privacy policy 3301. The modified version #3 is the version made available to the user 3203 at step S1500.

As will be apparent from the description above, it is thus possible to generate a modified version of the multimedia content 3100, associated with the first user determined at the step of selecting S2410. In the presence of more than one user recognized in the multimedia content 3100, a plurality of these modified versions can be generated for each user considered as first user at the step of selecting S2410.

In some preferred embodiments of the invention, the step of application S2400 can be implemented only after a request by the respective user acting as first user for the purposes of the step of selecting S2410. In other words, for example, the modified version #1 of the multimedia content Media #1 can advantageously be generated at the time at which the user 3201 requests access to the multimedia content Media #1. In this way, processing of a plurality of multimedia contents creating the respective modified versions is avoided in the absence of a request for access by the users. The request of the respective user can be implemented by means of a step of request for access, not illustrated, prior to step S1400. The step of request for access can advantageously be performed by one of the users 3201-3203, who is recognized by the service provider as associated with a user unique identifier. This user unique identifier can be used for the selection of the first user at step S2410.

Alternatively, or additionally, the method of FIG. 2A can be executed for all the users 3201-3203 visible in the multimedia content Media #1, selecting each time a different user as first user 3201 for the purposes of the step S2410, as schematically illustrated by the arrow that connects step S2430 to step S2410. It will be clear that this embodiment, which results in the automatic generation of all the modified versions of the multimedia content, according to the users viewed therein, is intended as optional, as schematically identified by the dashed line for the connection arrow.

In the embodiment of FIGS. 2A-2B the various modified versions of the multimedia content 3100 can be generated on request of the user 3201-3203, and/or independently by the service provider so as to have them ready at the time at which the user requests access thereto. This allows only one copy of the multimedia content 3100 to be maintained and modified versions to be created based on the need to access the multimedia content 3100. Therefore, this embodiment has the advantage of reducing the work load of the service provider in the case in which there are only a few requests for access for given multimedia contents, for example in the case in which the users 3201-3203 have no interest for said multimedia content. Moreover, this embodiment has the advantage of being able to generate modified versions of the multimedia content at the time of request for access of the users, thus giving the users more time to be able to configure their privacy policy so that it is taken into consideration at the time of creation of the modified versions of the multimedia content.

Alternatively, or additionally, the modified versions can be created independently from the request for access to the respective multimedia contents, and saved to allow a subsequent access by the users 3201-3203. This allows the service provider to distribute the work load over time, making better use of the computational resources available to the service provider.

Figure 4A:
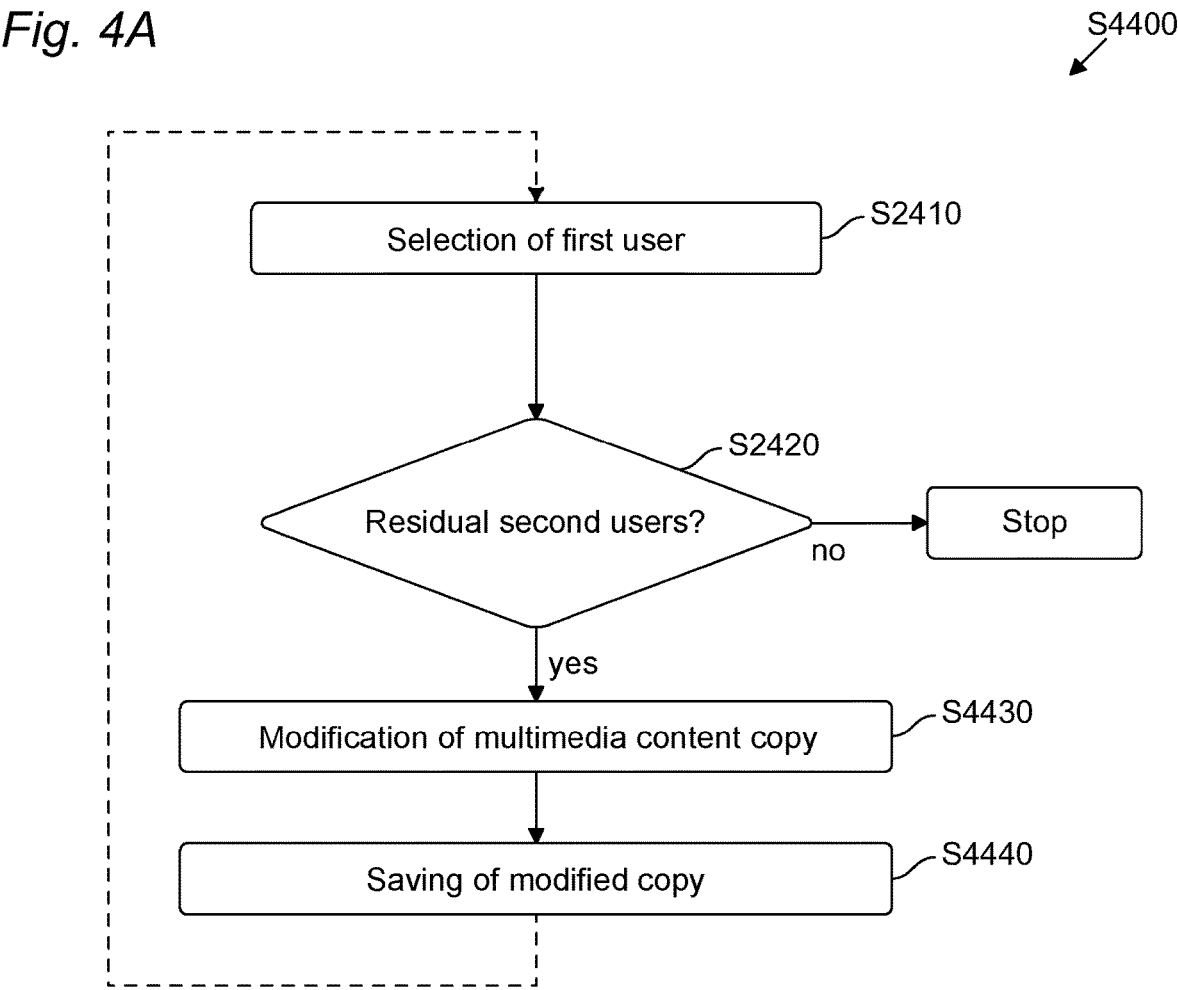
FIGS. 4A-4B schematically illustrate a possible embodiment of parts of the method 1000 of FIG. 1.
Figure 4B:
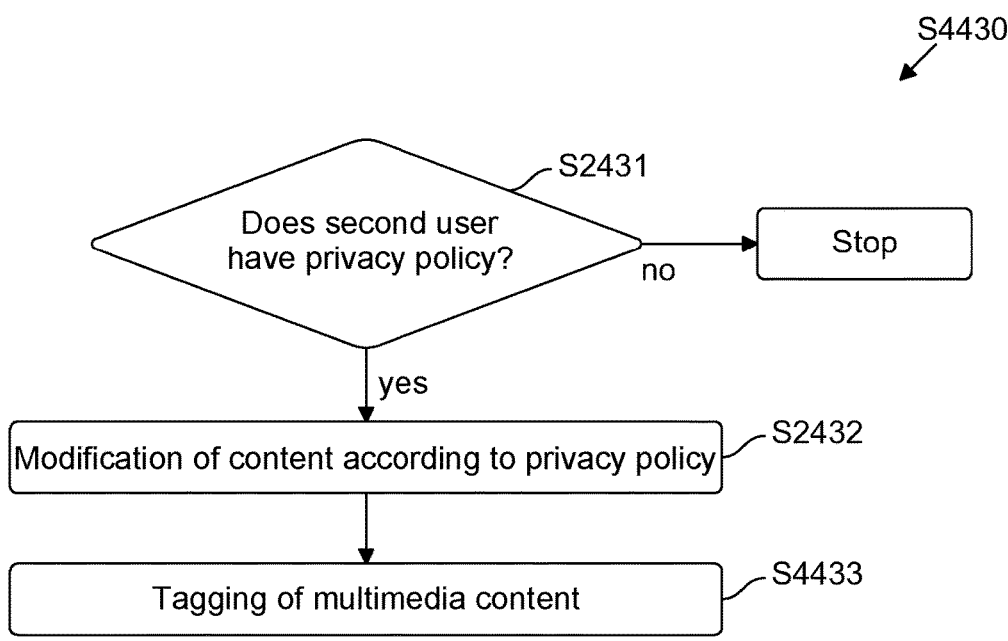
Figure 5:
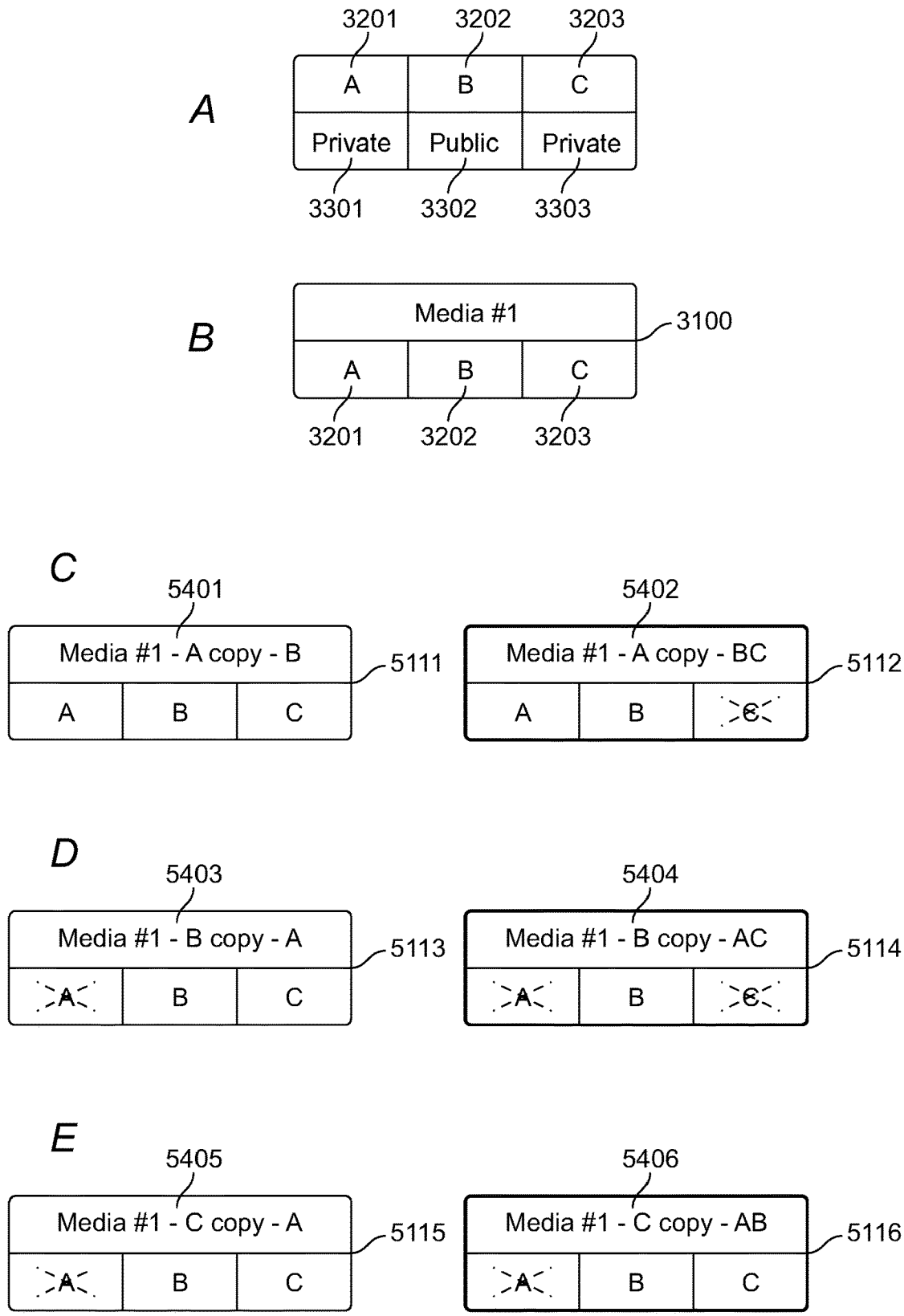
FIG. 5 schematically illustrates an example of application of the embodiment of FIGS. 4A-4B.

FIGS. 4A-4B schematically illustrate a possible embodiment of parts of the method 1000 of FIG. 1. FIG. 5 schematically illustrates an example of application of the embodiment of FIGS. 4A-4B.

In particular, as can be seen in FIG. 4A, a possible embodiment of the step of application described above can be obtained from the step of application S4400. Specifically, the step of application S4400 differs from the step of application S2200 described above replacing the step of modifying S2430 with a step of modifying S4430. Specifically, the step of modifying S4430 allows modification of a copy 5111-5116 of the multimedia content 3100. Moreover, the step of application S4400 comprises a step S4440 of saving the copy 5111-5116 of the multimedia content 3100. In this way, it is thus possible to save the modified multimedia content, making it available for a subsequent access by the user, for example by means of the access step S1500.

FIG. 4B further illustrates a possible embodiment of the step S4430 of FIG. 4A. In this embodiment, step S4430 differs from step S2430 described above, due to the presence of the step S4433 of generating a tag 5401-5406 associated with the copy 5111-5116 of the multimedia content 3100.

The tag 5401-5406 can be any type of digital information associated with the copy 5111-5116 of the multimedia content 3100, which allows the copy of the multimedia content to be associated with the unique identifier of the user for whom said copy was created. In other words, the tag can comprise any type of digital information that allows the copy to be associated with the unique identifier of the user corresponding to the first user of step S2410. For example, in an embodiment, it will be possible for the tag to correspond to the unique identifier of the user. In an alternative embodiment, for example in order to avoid risks associated with possible thefts of the unique identifiers of the users, following intrusions into the service provider system, the tag may be associated with an intermediate identifier, associated with the unique identifier of the user in a database saved by the service provider in a secure manner, so that in the case of loss of information any intruders only have access to the intermediate identifier.

In some embodiments, the association between the tags 5401-5406 and the copy of the multimedia content 3100 can be made directly in a digital file comprising the multimedia content 3100, for example with the addition of the tag 5401-5406 in the form of metadata of the digital file. However, it is clear that the invention is not limited to this embodiment and that alternatives are known to those skilled in the art to be able to associate a tag with a multimedia content in a unique way. For example, it will be possible to save in a specific database an association between the various tags and the names of the files comprising the corresponding multimedia content.

FIG. 5 schematically illustrates an example of application of the embodiment of FIGS. 4A and 4B, in order to make the operation thereof clearer.

The parts A and B of FIG. 5 correspond substantially to the respective parts of FIG. 3, and therefore will not be described in greater detail.

In the example of FIG. 5, the tag 5401-5406 is illustrated as an alphanumeric string that comprises an identification number of the multimedia content 3100, followed by a unique identifier corresponding to the user for whom the copy is created, i.e., the user who will have access to the copy, followed by one or more unique identifiers corresponding to the users whose privacy policies were taken into consideration in generation of the copy. Therefore, by way of example, the tag 5402 "Media #1—A copy—BC" indicates that the multimedia content associated with the tag is the content "Media #1", that the copy of the multimedia content associated with the tag is the one provided for access by the user corresponding to the unique identifier "A", and that for generation of the copy in question the privacy policy of the users corresponding to the unique identifiers "B" and "C" were taken into consideration. This organization of the subject advantageously allows different information to be provided in a single alphanumeric string. However, it will be clear to those skilled in the art that not all this information is required for implementation of the tags 5401-5406.

For example, in the case in which the tag is associated with a digital file that allows recognition as "Media #1", it will not be necessary to add this information to the tag.

Alternatively, or additionally, it is not necessary to include in the tag the users whose privacy policies were considered for generation of the copy, for example "B" and "C" in the case of the tag 5402. Although this information can be advantageous, as will be apparent below, for example in the case in which users configure their privacy policy after generation of the copy 5112, this information can be managed in alternative ways that will be apparent to those skilled in the art or can be ignored.

Therefore, it is evident that it is sufficient for the tag 5401-5406 to allow identification of the user for whom the copy associated with the tag was created, while further additional information comprised in the tag can optionally allow further benefits, which however are not necessary for implementation of the invention.

In some embodiments, the tag can also comprise a temporary unique identifier, as described above, for any second users who are not associated with a unique identifier registered with the service provider.

As can be seen in part C of FIG. 5, a first copy 5111 of the multimedia content 3100 can be created considering the user "A" as first user of step S2410 and applying the privacy policy of the second user "B", for example assuming that at the time of generation of the copy 5111, the service provider was only provided with a privacy policy relating to the user "B". Therefore, in the case in which no further privacy policies of further second users are present, the copy 5111 may be considered as final and saved for future access by the user "A" wishing to access the multimedia content "Media #1". Alternatively, or additionally, in the case in which a privacy policy of further second users is present, for example in the case in which the privacy policy of the second user "C" is present, the multimedia content can be further modified so as to apply also the privacy policy of the remaining second users, hence, in the example of Fig. C, of the second user "C". Therefore, the copy 5112 results from the application of all the privacy policies of the second users, available at the time of generation of the copy destined for access by the first user. The copy 5112 can thus be saved with the service provider, so as to be subsequently available for the first user identified by the tag 5402.

Analogously, as can be seen in the sections D and E of FIG. 5, application of the method of FIGS. 4A and 4B with first users respectively "B" and "C" results in the generation of the respective copies 5114 and 5116, associated with the respective tags 5404 and 5406.

As indicated above, in some embodiments, the tags 5401-5406 can contain, or can be associated with, the unique identifiers of the users whose privacy policies were taken into consideration for generation of the copy associated with the tag. In this way, it is advantageously possible to know, at all times, whether or not the privacy policies of all the faces recognized in the multimedia content have been taken into consideration.

For example, in the case in which four faces have been recognized in the multimedia content, one of these will be the face corresponding to the first user for whom the copy is generated while three will be those corresponding to the second users. In the case in which the tag can lead to identification of the second users whose respective privacy polices were taken into consideration, and this allows identification of a number of users fewer than the remaining faces in the multimedia content, it will be possible to recognize that a corresponding privacy policy has not been identified for at least one face visible in the multimedia content. This can occur, for example, because the person corresponding to the face has not yet been able, or has not considered it necessary, to configure his/her privacy policy.

This information can be particularly advantageous in some embodiments of the invention, in which it will be possible to save the faces for which it has not been possible to apply a privacy policy, or for which a default privacy policy has been applied. In this way, during and/or following the execution of the step of configuration S1300, it will be possible to check whether the face of the user corresponds to one of these faces. In this case, in some embodiments, it will be possible to identify one or more copies of the multimedia contents for which, in the generation of the copy, no privacy policy, a default privacy policy, has been used for said face. For the one or more copies thus identified it will be possible to generate a new copy, also taking into consideration the privacy policy that has just been configured for the user, and preferably updating the tag accordingly. Therefore, this embodiment is particularly advantageous as it allows modification of any copies of multimedia contents, created before configuration of the privacy policy of a given user, at the time at which this user decides to configure his/her privacy policy.

The embodiments described above have illustrated different examples of how a multimedia content can be modified, so as to allow users to access it in compliance with the privacy policy of the users visible in the multimedia content. In general, modification of the multimedia content as relative to the modification of at least parts of the multimedia content comprising the face of the users associated with the privacy policy has been described. In the various embodiments, modification of the multimedia content can be implemented in "real-time" upon request by one or more users, as for example described in relation to the embodiment of FIG. 2A. Alternatively, or additionally, the modification can be saved in a copy made available subsequently to the user, as described, for example, in relation to the embodiment of FIG. 4A.

In both cases, the generation of the copies and/or of the modified versions of the multimedia content can require a substantial use of data storage resources. In some embodiments, it will thus be preferable to implement the invention so as to reduce the amount of data storage resources. For this purpose, a possible advantageous embodiment of the invention will be described with reference to FIGS. 6A and 6B.

Figure 6A:
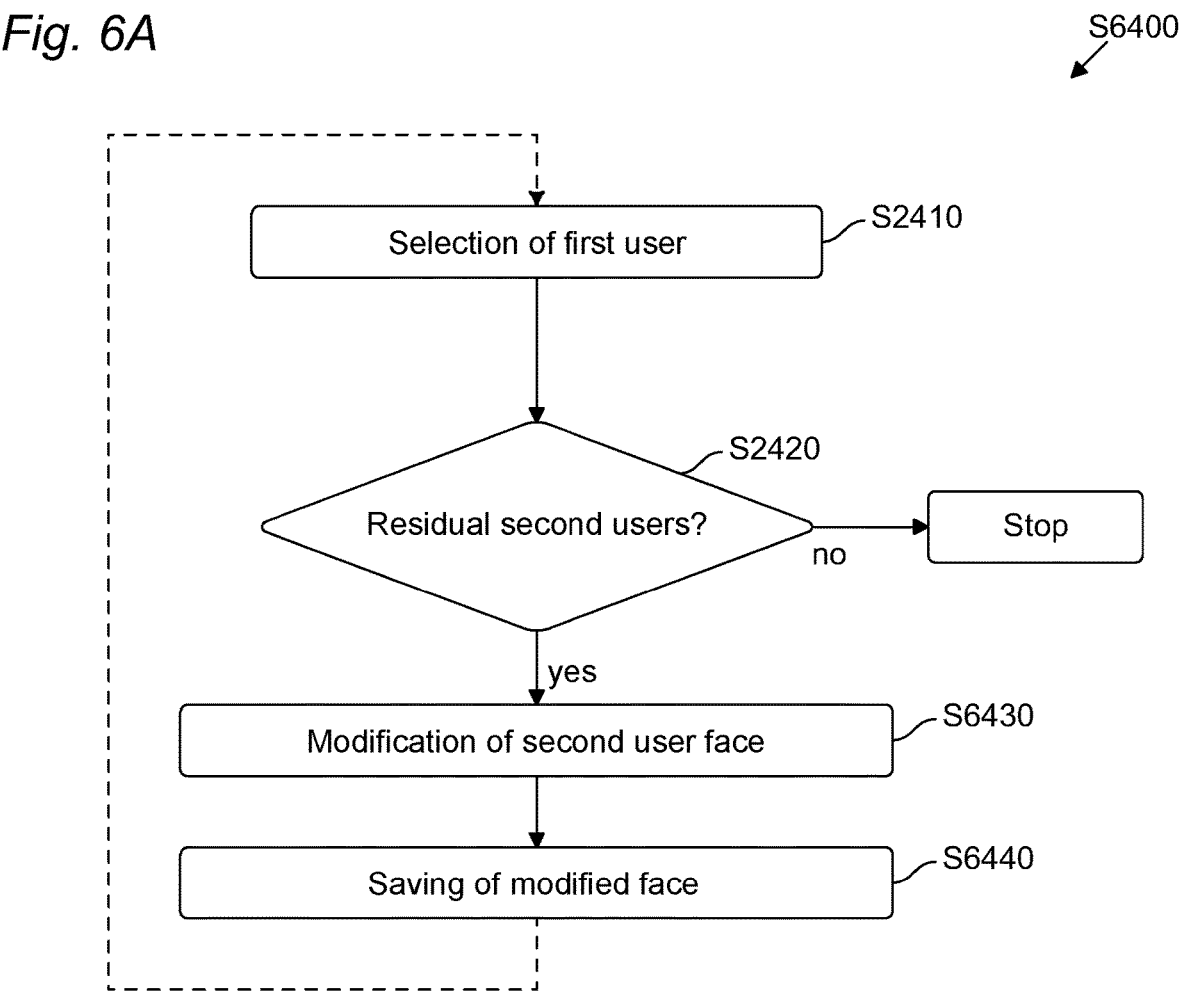
FIGS. 6A-6B schematically illustrate a possible embodiment of parts of the method 1000 of FIG. 1.
Figure 6B:
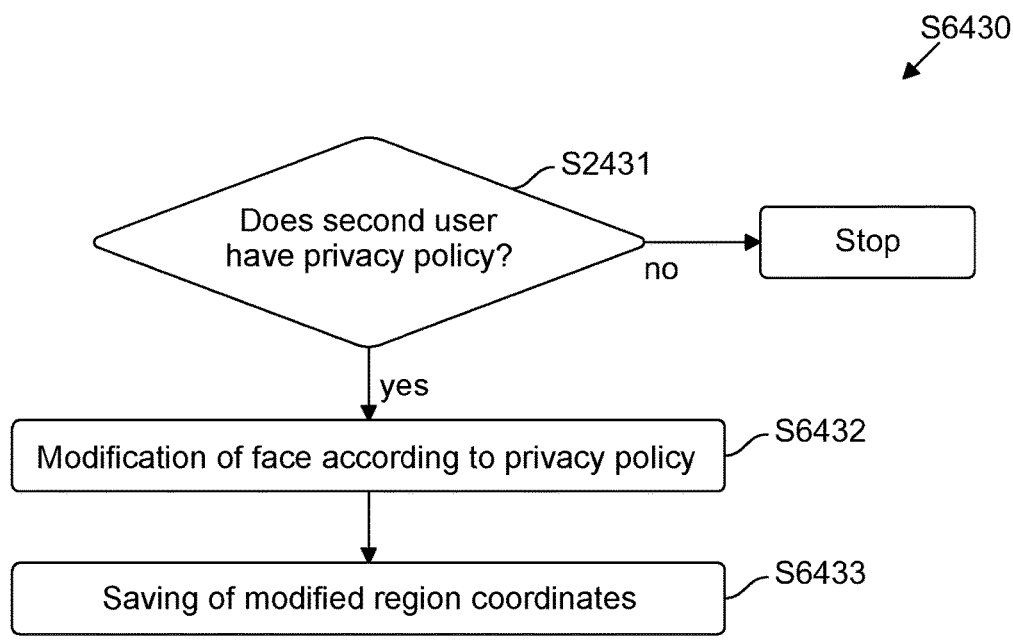

FIGS. 6A-6B schematically illustrate a possible embodiment of parts of the method 1000 of FIG. 1. In particular, FIG. 6A illustrates a possible implementation of a step of application, in the form of a step of application 6400. As can be seen in FIG. 6A, the step of application 6400 differs from the steps of application recently described due to the presence of a step S6430 of modification of the user face and a step S6440 of saving the modified face. In general, the approach of the embodiment illustrated in FIG. 6A is that of modifying and saving only the part, or the parts, of the multimedia content in which a face, for which a privacy policy is present, has been identified. In this way, the rest of the multimedia content 3100 can be maintained in its original form and the modifications resulting from the application of the one or more privacy policies of the second users can be superimposed on the original multimedia content 3100, during access to the multimedia content by the first user, for example in step S1500.

In particular, at the step of modifying S6430 it is possible to modify the part of the multimedia content 3100 comprising a face of the one or more second users 3202-3203. Determination of the part of the multimedia content comprising the face of the one or more second users can be implemented, for example, at step S1200 as described above. Modification can comprise any modification algorithm in accordance with the privacy policy of the user recognized in the multimedia content. The step of saving S6440 can thus be limited to saving the modified part of the multimedia content 3100.

As can be seen in FIG. 6B, in some embodiments, the step S6430 of modification can comprise a step S6443 of saving coordinates of the modified part of the multimedia content 3100.

In some embodiments, the part of the multimedia content modified can be saved together with the coordinates identifying a position of the multimedia content 3100 where the modified part will be superimposed. The modified part of the multimedia content can also be associated with a tag, in a similar way to what was described above. For example, in some embodiments, the tag can comprise information that allows identification of at least the first user for which the modification was implemented the one or more second users whose privacy policies were taken into consideration for generating the modified part of the multimedia content.

The modified part of multimedia content does not necessarily correspond to only one face. In some embodiments, the modified part of the multimedia content can correspond to one or more faces, and hence potentially to one or more distinct areas of the multimedia content. For example, with reference to what was described above for FIG. 5, instead of saving a whole copy 5112 of the multimedia content "Media #1" the embodiment according to FIG. 6A could allow saving of only the modified part of the multimedia content corresponding to the face of the user "C" in accordance with the privacy policy of the user "C". Again by way of example, instead of saving a whole copy 5114 of the multimedia content "Media #1" for a subsequent access of the user "B", it will be possible to save one or more modified parts of the multimedia content "Media #1" corresponding to the relative areas of the multimedia content comprising the faces of the users "A" and "C".

Therefore, it is evident that the implementation of steps S6430 and S6440 advantageously allows a reduction in the amount of data storage resources required for saving the modified versions of the multimedia content to be made accessible to the first users in consideration of the privacy policies of the second users.

In the embodiments described above, reference was made to a single configuration of the privacy policy of one or more users implemented at step S1300. However, one or more of the users may decide to configure his/her policy subsequently and/or to modify his/her privacy policy after having previously configured it. With regard to this possible situation, FIG. 7 schematically illustrates a possible embodiment of a method 7000 for privacy management of multimedia contents.

In particular, as can be seen in FIG. 7, the method 7000 differs from the method 1000 due to the presence of at least one second step of configuration S7300. In some embodiments, the second step of configuration S7300 can allow a given user, who has already performed the first step of configuration S1300, to modify his/her privacy policy with the second step of configuration S7300. Alternatively, or additionally, in some embodiments, the second step of configuration S7300 can allow a user, who has not yet performed the first step of configuration S1300 to configure his/her privacy policy.

In the case in which modification of the multimedia content 3100, according to one of the steps of application described, takes place in "real time", for example as in the case of the embodiment described with reference to FIG. 2A, the effect of the addition to or modification of the privacy policy at step S7300 is that the modifications of the multimedia content 3100 subsequent to step S7300 will take the new privacy policy into consideration.

Instead, in the case in which the modification of the multimedia content 3100 has been saved, as for example in the case of the embodiments described with reference to FIGS. 2A, 4A and 6A, the presence of the new privacy policy can make it necessary to modify the copies of the multimedia content, already made previously.

In some embodiments, it will thus be possible to analyse all the multimedia contents 3100 for which copies have already been made, or the modifications of parts of the multimedia contents, to determine whether the face of the user corresponding to the new privacy policy registered at step S7300 is present in said multimedia contents. In the case in which the face of this user is identified in a multimedia content 3100, the copies associated with this multimedia content, or of parts thereof, can be eliminated and replaced by new copies generated taking the new privacy policy into consideration. In other words, in a second step of application of the privacy policy S7400 it will be possible to replace the copies generated previously at the first step of application S1400, in consideration of the new privacy policy. In this way, in a second step S7500 of accessing the multimedia content the user will have access to the copies generated based on the new privacy policy. In some particularly advantageous embodiments, it is possible that the modification to the privacy policy introduced at step S7300 consists in changing from a privacy policy that did not allow the face of the user as in the original multimedia content to be maintained, for example requiring the face of the user to be obscured or anonymized, to a privacy policy that allows the face of the user to remain visible as present in the original multimedia content. In this case, in some embodiments, instead of generating new copies of the multimedia content, it is possible simply to modify the existing copies, superimposing the face of the user, as shown in the original multimedia content, on the various copies. This embodiment is particularly advantageous as it does not require the generation of new copies of the multimedia content, or of parts thereof, with modified and/or obscured faces, which generally requires a greater use of computational resources than those required to simply superimpose parts of the original multimedia content on the various copies.

In the various embodiments described, reference has been made to modification of the multimedia content, or to modification of parts of the multimedia content comprising the face of the second user, in a generic way, without specifying which types of modification are implemented. This has been done as it is possible to implement different types of modifications to a multimedia content, which allow the various users to have control over the level of privacy they wish to obtain for the parts of the multimedia content that show them. Different algorithms are known, for example, given an area of a multimedia content comprising a face, to:
- completely obscure the area, for example by superimposing a coloured area,
- blur the face,
- replace the face with an artificial face, created with AI algorithms, (e.g. StyleGAN)
- modify only some facial features, automatically or optionally by allowing the user with whom the face is associated to decide which features are to be modified and how, but maintaining the original face as starting point, by means of AI algorithms (e.g. AttGAN) etc.

it will thus be possible for the service provider to provide different levels of privacy to the various users, corresponding to the various algorithms that can be used to modify the parts of the multimedia contents comprising the respective faces. The choice of the algorithm to be used to modify the multimedia content will thus depend on the algorithms made available by the service provider and on the choice among these made by the user during configuration of his/her privacy policy.

It will also be possible to apply a further correction step of the image in order to make the face constructed or modified more realistic within the context of the image in which it appears. These include, for example, the possibility of applying corrections of colour and brightness, corrections of perspective, of the vertices and of the dots that make up the mesh of the face, of exposure etc., in order to blend the new face as much as possible with the body of the designated user, with the background, with facial expression and with the proportions of the salient features of the user.

In preferred embodiments, the default privacy policy, applied to users who have not configured a privacy policy, can preferably correspond to replacement of their face with an artificial face, created with AI algorithms. This approach is particularly advantageous as, while maintaining the privacy of these users, it results in a visual impact that is very limited, or even invisible in the case in which the modified face of the user is not known, thereby making viewing of the multimedia content more pleasing for the other users that are shown therein and who access it at the step of access.

An embodiment of the invention can further refer to software, configured so as to, when executed on a processor, operate the processor so as to execute one or more of the steps of the methods described above.

Different embodiments have been described in the description above, it will be clear that the invention is not limited to the embodiments described and/or illustrated. Moreover, it will be apparent to those skilled in the art that different features of different embodiments can be combined, regardless of the other features of the respective embodiments, in order to obtain new embodiments of the invention. For example, step S4433 can be combined with step S6433, so as to comprise the coordinates of the modified region in the tag.

REFERENCE NUMBERS

1000: method for privacy management of multimedia content
S1100: step of acquisition
S1200: step of recognition
S1300: step of configuration
S1400: step of application
S1500: step of access
S2400: step of application
S2410: step of selecting
S2420: evaluating step
S2430: step of modifying
S2431: second evaluating step
S2432: second step of modifying
3100: multimedia content
3100A-3100C: modified multimedia content
3201-3203: user
3301-3303: privacy policy
S4400: step of application
S4440: step of saving
S4430: step of modifying copy
S4433: step of generating a tag
5111-5116: copy
5401-5406: tag
S6400: step of application
S6430: step of modifying face
S6440: step of saving face
S6432: second step of modifying face
S6433: step of saving coordinates
7000: method for privacy management of multimedia content
S7300: step of configuration
S7400: step of application
S7500: step of access

The invention claimed is:

1. Method for privacy management of multimedia contents comprising:
   a step of acquisition of at least one multimedia content,
   a step of recognition of one or more users shown in the multimedia content,
   a step of configuration of a privacy policy associated with at least one user among the one or more users, and
   a step of application of the privacy policy to the multimedia content;
   wherein the application step comprises:
   a step of selecting a first user among the one or more users, an evaluating step to evaluate whether in the multimedia content one or more second users are shown, different from the first user, and
   if at the evaluating step it is evaluated that in the multimedia content one or more second users are shown, different from the first user,
   a step of modifying at least part of the multimedia content based on the privacy policy associated with the one or more second users, and
   wherein the step of modifying comprises:
   a step of saving coordinates of the modified part of the multimedia content.

2. The method according to claim 1, wherein the step of modifying comprises:
   a second evaluating step to evaluate whether a privacy policy is associated with the one or more second users, and
   if at the second evaluating step it is evaluated that a privacy policy is associated with the one or more second users,
   a second step of modifying the multimedia content based on the privacy policy associated with the one or more second users.

3. The method according to claim 1,
   wherein at the step of modifying a copy of the multimedia content is modified.

4. The method according to claim 3, further comprising:
   a step of saving the copy of the multimedia content.

5. The method according to claim 3, wherein the step of modifying comprises:
   a step of generating a tag associated with the copy of the multimedia content.

6. The method according to claim 1,
   wherein at the step of modifying the part of the multimedia content comprising a face of the one or more second users is modified.

7. The method according to claim 6, further comprising:
   a step of saving the modified part of the multimedia content.

8. A non-transitory computer readable medium which execution instructions performed on a processor configured so as to execute the method according to claim 1.

* * * * *